(12) United States Patent
Tsuda (10) Patent No.: US 8,206,778 B2
(45) Date of Patent: *Jun. 26, 2012

(54) METHOD OF MANUFACTURING A MAGNETIC RECORDING MEDIUM

(75) Inventor: Kouichi Tsuda, Matsumoto (JP)

(73) Assignee: Fuji Electric Device Technology Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/656,571

(22) Filed: Feb. 3, 2010

(65) Prior Publication Data

US 2010/0195249 A1    Aug. 5, 2010

(30) Foreign Application Priority Data

Feb. 4, 2009  (JP) ................. 2009-024097

(51) Int. Cl.
*C25D 5/02* (2006.01)
*G11B 5/84* (2006.01)
*G09B 5/02* (2006.01)
*G11B 5/82* (2006.01)

(52) U.S. Cl. ............ 427/126.1; 427/129; 427/239; 427/309; 510/338; 29/603.13; 428/848.8

(58) Field of Classification Search ......... 438/622, 438/584, 623, 757; 430/311, 314; 510/175, 510/157, 407, 117, 338; 134/36, 38, 22.12, 134/22.11, 22.18, 34, 30; 257/200; 427/126.6, 427/127, 97.7, 126.1, 58, 125, 129, 239, 427/309, 96.1, 97.1; 428/848.5, 848.8, 846.4, 428/846.2, 846.3, 846.7; 423/611; 216/56, 216/74, 75, 77; 29/603.13, 603.16, 603.15, 29/603.14

See application file for complete search history.

(56) References Cited

U.S. PATENT DOCUMENTS 4,109,287 A    8/1978  Kawai et al.
6,562,146 B1 *  5/2003  DeYoung et al. ............... 134/30
(Continued)

FOREIGN PATENT DOCUMENTS

JP    51-21562    7/1976
(Continued)

OTHER PUBLICATIONS

Machine translation—Katsuyuki et al; JP 2005-120421, (Dec. 2005).*

(Continued)

*Primary Examiner* — Kevin M. Bernatz
*Assistant Examiner* — Louis Falasco
(74) *Attorney, Agent, or Firm* — Rabin & Berdo, P.C.

(57) ABSTRACT

A method of manufacturing a magnetic recording medium includes the steps of forming an intermediate layer that is electrically conductive over a non-magnetic substrate; forming an aluminum-containing layer on the intermediate layer; forming a plurality of micro pits in the aluminum-containing layer; generating an alumina-containing layer by anode oxidation of the aluminum-containing layer and simultaneously forming a plurality of nano holes in the alumina-containing layer originating from the plurality of micro pits respectively to expose the intermediate layer; cleaning and drying the plurality of nano holes using a fluid selected from the group consisting of a sub- and super-critical carbon dioxide fluid; and depositing a magnetic metal selectively through the plurality of nano holes on the intermediate layer to form a plurality of magnetic recording elements that collectively form a magnetic recording layer.

13 Claims, 3 Drawing Sheets

U.S. PATENT DOCUMENTS

| | | | |
|---|---|---|---|
| 2003/0124462 A1* | 7/2003 | Miller | 430/311 |
| 2004/0196593 A1* | 10/2004 | Yasui et al. | 360/135 |
| 2004/0201042 A1* | 10/2004 | Den et al. | 257/200 |
| 2004/0216772 A1* | 11/2004 | Xu et al. | 134/36 |
| 2004/0229449 A1* | 11/2004 | Biberger et al. | 438/584 |
| 2005/0079282 A1* | 4/2005 | Jin | 427/126.6 |
| 2005/0107274 A1* | 5/2005 | Daviot | 510/175 |
| 2006/0068583 A1* | 3/2006 | Kawamura et al. | 438/623 |
| 2006/0115411 A1* | 6/2006 | Jensen et al. | 423/611 |
| 2007/0000521 A1* | 1/2007 | Fury et al. | 134/22.12 |
| 2007/0144555 A1* | 6/2007 | Chen et al. | 134/34 |
| 2007/0149429 A9* | 6/2007 | Roeder et al. | 510/175 |
| 2007/0184647 A1* | 8/2007 | Furukawa et al. | 438/622 |

FOREIGN PATENT DOCUMENTS

| | | | |
|---|---|---|---|
| JP | 2003-045004 A | | 2/2003 |
| JP | 2003-321798 A | | 11/2003 |
| JP | 2005-120421 A | | 5/2005 |
| JP | 2006-012249 A | | 1/2006 |
| WO | WO 2005093032 | * | 10/2005 |

OTHER PUBLICATIONS

"Thermally Assisted Magnetic Recording," Fujitsu, vol. 58, No. 1, pp. 85-89 (2007).

"Nanohole Patterned Media," Fujitsu, vol. 58, No. 1, pp. 90-98 (2007).

Hideki Masuda et al, "Control of Nanohole Shapes of Anodic Porous Alumina and Its Applications," Surface Science, vol. 25, No. 5, pp. 260-264 (2004).

Satoshi Kawai, "Functional Anodic Treatment on Aluminum," monograph published by Maki Publishing Co, Ltd, pp. 146-150 (2005).

Eiichi Kondou, "Thin Film Deposition from Supercritical Fluids," Surface Technology, vol. 57, No. 10, pp. 13-18 (2006).

* cited by examiner

METHOD OF MANUFACTURING A MAGNETIC RECORDING MEDIUM

CROSS-REFERENCE TO RELATED APPLICATION

This application is based on, and claims priority from, Japanese Patent Application No. 2009-024097 filed on Feb. 4, 2009, the contents of which are incorporated herein by reference.

BACKGROUND OF THE INVENTION

1. Field of the Invention

The present invention relates to a method of manufacturing a magnetic recording medium, in particular to such a method that provides a bit patterned media (BPM) with high precision having multiple magnetic recording elements that are separately distributed. The invention also relates to a magnetic recording medium manufactured by the method.

2. Description of the Related Art

Magnetic disk drives are expanding their field of application and are tending to decrease in size. Magnetic recording media mounted on the magnetic disk drives thus are required to continually enhance their recording density. With the recent demand for high density recording of the magnetic recording medium, the magnetic recording scheme is changing from the conventional longitudinal recording scheme to the perpendicular recording scheme, the latter being capable of higher recording density.

With reduction in bit size for the purpose of raising the recording density in this situation, a problem has become significant that the recorded signal degrades due to easier random inversion of magnetization caused by thermal fluctuation of the magnetic substance. In order to hinder the thermal fluctuation to suppress this degradation of signals, it is possible to use a material with a large crystalline magnetic anisotropy energy constant for a magnetic recording layer. A material with a large value of this constant, however, exhibits a large coercivity, with the consequence of a large magnetic field required for magnetization inversion, which raises another problem of difficulty in the information write process.

Therefore, a multiple of proposals have been made for the thermally assisted recording technology to avoid degradation of recorded signals caused by the thermal fluctuation of the magnetic substance. The following are some examples of disclosures regarding this technology.

Japanese Unexamined Patent Application Publication No. 2006-012249 discloses a thermally assisted magnetic recording device comprising a substrate and a hard magnetic recording layer formed on the substrate, wherein the exchange coupling energy between magnetic grains composing the magnetic layer is large at room temperature to thermally stabilize the magnetization of the magnetic grains, and the exchange coupling energy is decreased during the recording process by heating the recording layer with a heating means to sharpen the gradient of recording magnetization transition.

Japanese Unexamined Patent Application Publication No. 2003-045004 discloses an optically assisted magnetic head comprising a floating slider that flies owing to rotation of a disk having a recording medium, an optical waveguide that is provided on the floating slider and emits laser light of a semiconductor laser from an emission end, a near field light minimizing means that minimizes a near field light formed at the emission end of the optical waveguide by the laser light from the semiconductor laser and emits near field light onto the recording medium to heat the recording medium, and a thin film magnetic transducer that is provided on the floating slider and records information on the area of the recording medium heated by the near field light minimizing means.

FUJITSU, Vol. 58, No. 1, p. 85-89 (2007), a Japanese language article, discloses thermally assisted magnetic recording that utilizes Curie temperature recording. In the document, the possibility of thermally assisted magnetic recording has been studied by assembling a write-read tester and using a conventional optical head, a recording medium, and a magnetic head. The document describes that write-read is capable on a high coercivity medium of Hc=13 kOe exhibiting good thermal fluctuation resistance and the recording width is narrowed down to 30% or less as compared with a magnetic disk at that time (100 Gbit/in$^2$).

In the thermally assisted recording technologies disclosed in Japanese Unexamined Patent Application Publication No. 2006-012249, Japanese Unexamined Patent Application Publication No. 2003-045004, and FUJITSU, Vol. 58, No. 1, p. 85-89 (2007), the recording medium is heated to a temperature near the Curie temperature by laser light irradiation or the like to decrease the coercivity and recording is carried out at this condition. After that, the recording medium is quenched to increase the coercivity and information is stored in this condition. This technology allows writing at a low magnetic field and ensures long term stability of a magnetic substance without the influence of thermal fluctuation.

However, when the above-mentioned thermally assisted recording technology is used in a conventional discrete track medium in which magnetic recording elements are continuously arranged, a problem exists that adjacent magnetic recording elements are also heated raising their temperature.

Additional problems accompany the desired increase in recording density of the magnetic recording medium, including a problem of cross talk, that is, a write on the adjacent track other than the intended track due to divergence of the recording magnetic field of the magnetic head and a problem of cross read, that is, a read of a signal in a track other than the intended track.

These problems can be eliminated if the magnetic recording elements are isolated thermally and magnetically at the same time. Thus, a technology called a bit patterned medium (BPM) technology has been proposed for the purpose of thermally and magnetically isolating magnetic recording elements from one another.

Some specific techniques of the BPM technology have been proposed to date. A technique among them utilizes alumina nano holes (ANHs) formed by anodizing aluminum.

The ANHs are formed in self organization in the process of anodization originating from micro pits formed on an aluminum-containing layer. Consequently, when the micro pits are arranged in a triangular lattice pattern or a square lattice pattern, the obtained ANHs are also arranged in the triangular lattice pattern or in the square lattice pattern. Some techniques for the ANHs have been disclosed as shown in the following.

FUJITSU, Vol. 58, No. 1, p. 90-98 (2007), a Japanese language article, discloses anodized porous alumina formed by anodizing aluminum. The document describes the anodized porous alumina concerning control of the nano hole configuration and application to a mold process, and states that the nano hole configuration can be controlled in a nanometer scale and consequently, the anodized porous alumina is suited for a starting material in forming various shapes of nano structures. The document further says that the anodized porous alumina has various merits including good thermal resistance and high mechanical strength, and the possibility to provide a membrane with the nano holes perpendicular to the film surface, and is thus applicable to processes for composing a variety of materials.

Japanese Examined Patent Application Publication No. S51-021562 and Hideki MASUDA et al., HYOUMEN KAGAKU (Surface Science), Vol. 25, No. 5, p. 260-264 (2004), a Japanese language article, disclose nano hole patterned media comprising nano holes obtained by anodizing aluminum. Hideki MASUDA et al. set forth development of a process to obtain a disk of a nano hole patterned medium and succeeded in evaluating the write-read characteristics of a magnetic head, elucidating an effect of minimizing the nano holes. The document also states that a performance improvement effect has been shown by providing a soft magnetic underlayer film enabling write-read with a magnetic head for perpendicular magnetic recording. The document further describes the development of a one dimensional arrangement technique to align the nano holes in the circumferential direction and the prospect for achieving a recording of 1 T bit/in$^2$.

In the technology disclosed in Japanese Examined Patent Application Publication No. S51-021562 and in Hideki MASUDA et al., HYOUMEN KAGAKU (Surface Science), Vol. 25, No. 5, p. 260-264 (2004), the alumina in which the ANHs are formed is a non-magnetic material and has a very small thermal conductivity. Utilizing these properties of the alumina, studies have been made to form a magnetic recording medium in which the magnetic recording elements are thermally and magnetically isolated and one hole corresponds to one bit, by filling the arrangement-controlled ANHs with a magnetic substance by means of an electroplating method.

In addition to the Japanese Examined Patent Application Publication No. S51-021562 and the above-mentioned Hideki MASUDA et al. article, Japanese Unexamined Patent Application Publication No. 2005-120421, for example, discloses a magnetic recording medium using a multiple of nano holes (ANHs) formed by anodizing an aluminum-hafnium alloy layer.

Japanese Unexamined Patent Application Publication No. 2003-321798 discloses an electro-chemical treatment method, such as electroplating, in which electrode materials for a cathode and an anode are installed in a reactor vessel containing electrolytic substances and a sub- and super-critical state is established in the reactor vessel containing the electrolytic materials and electrolytic solution. Under such a state, the electrode material is electrolyzed or the electrolyzed electrode material and/or the electrolytic materials contained in the electrolytic solution are deposited and adhere to the other electrode material. (See claim 1 of this document).

Paragraph 0059 of the above Japanese Unexamined Patent Application Publication No. 2003-321798 sets out that, after discharging the carbon dioxide being used, valve 38 is closed and valve 25 is opened to introduce the high pressure carbon dioxide 7 into the plating bath 1, pressurizing and heating the inside of the plating bath 1, thereby establishing a super-critical state of the carbon dioxide, which comes in contact with the article 4 to be treated. Thus, the moisture component adhered on the article 4 and the anode 3 is eliminated and dried rapidly and efficiently.

The above Japanese Unexamined Patent Application Publication No. 2003-321798 further states that the technique to deposit and stick one electrode material onto the other electrode material can be applied to processes of electroforming and anodized-film forming, which are similar in principle to the invented technique of Japanese Unexamined Patent Application Publication No. 2003-321798 (see Paragraph 0069 therein).

Even in the magnetic recording media in the BPM technology using ANHs exhibiting good characteristics as described above, the following problem has become apparent with the progress of the efforts for enhancing the recording density.

Specifically, an amount of filled magnetic substance is apt to be uneven in filling fine ANHs with the substance by means of an electroplating method. The phenomenon is significant for ANHs with a diameter not larger than 25 nm, the reason for which is described in the following.

The relation among a radius, r, of an ANH, a surface tension, $\gamma$, of a plating liquid with the ANH, and a pressure difference, $\Delta P$, necessary for the plating liquid to enter the ANH is given by the Formula (I) called Laplace's equation as follows.

$$\Delta P = 2\gamma/r \tag{1}$$

According to Formula (I), with decrease in the ANH radius, r, the pressure difference, $\Delta P$, necessary for the plating liquid to enter the ANH increases in inverse proportionality to the ANH radius, r. As a result, the plating liquid hardly enters the ANH with a diameter not larger than 25 nm, thus failing to uniformly fill the ANHs with a magnetic substance by a plating method.

Although Japanese Unexamined Patent Application Publication No. 2003-321798 discloses rapid and efficient elimination and drying of the moisture component adhered on the treated article using super-critical carbon dioxide, the document does not mention or suggest the above-described problem that the plating liquid hardly enters the ANH with a diameter not larger than 25 nm, thus failing to uniformly fill the ANHs with magnetic substance by the plating method.

It is therefore an object of the present invention to provide a method of manufacturing a magnetic recording medium using ANHs in which the ANHs are filled with a magnetic metal uniformly and selectively even for ANHs with a diameter not larger than 25 nm.

SUMMARY OF THE INVENTION

In order to accomplish the above object, a method of manufacturing a magnetic recording medium according to the present invention comprises the steps of: providing a non-magnetic substrate; forming an intermediate layer that is electrically conductive over the non-magnetic substrate; forming an aluminum-containing layer on the intermediate layer; forming a plurality of micro pits in the aluminum-containing layer; generating an alumina-containing layer by oxidizing the aluminum-containing layer and simultaneously forming a plurality of nano holes in the alumina-containing layer originating from the plurality of micro pits respectively to expose the intermediate layer; cleaning and drying the plurality of nano holes using a sub- and super-critical fluid; and depositing a magnetic metal selectively through the plurality of nano holes on the intermediate layer to form a plurality of magnetic recording elements that collectively comprise a magnetic recording layer. Preferably depositing is directly onto and in contact with the intermediate layer.

The method of the invention can be applied to manufacture of bit patterned media (BPM).

Preferably in the method of manufacturing a magnetic recording medium, the sub- and super-critical fluid is a sub- and super-critical carbon dioxide fluid. Preferably, the magnetic metal is selected from the group consisting of cobalt, iron, and alloys of Fe—Pt, Co—Pt, Fe—Pd, and Co—Pd. Preferably, each of the plurality of nano holes has a diameter that does not exceed 25 nm. In addition, the intermediate layer is preferably composed of a material selected from the group consisting of metallic elements of Ru, Os, Pt, Pd, Ir, Rh, and Au, and alloys mainly composed of these metallic elements. Depositing the magnetic metal selectively through the plurality of nano holes on the intermediate layer may be accomplished electrochemically. Preferably, electrochemically depositing the magnetic metal takes place uniformly and selectively through the plurality of nano holes directly onto and in contact with the intermediate layer.

The present invention includes a magnetic recording medium manufactured by the above-described method of manufacturing a magnetic recording medium. Such a magnetic recording medium includes a magnetic recording layer provided on an intermediate layer that is electrically conductive, the magnetic recording layer being comprised of a plurality of magnetic recording elements (a) that are uniformly and selectively disposed in respective nano holes which each have a diameter that does not exceed 25 nm and which are defined within and through an alumina-containing layer, and (b) that are in direct contact with the intermediate layer.

According to the method of manufacturing a magnetic recording medium of the invention, substance, such as residual electrolytic solution remaining in the nano holes is thoroughly eliminated by cleaning and drying the nano holes in the alumina-containing layer using a sub- and super-critical fluid. Therefore, a magnetic metal is electrochemically reduced selectively by electrolytic plating and uniformly fills the nano holes on the intermediate layer exposed at the bottom plane of each of the nano holes.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIGS. 1(a) through 1(e) are sectional views showing the steps in a method of manufacturing a magnetic recording medium 10 according to the invention, wherein:

DETAILED DESCRIPTION OF THE INVENTION

In order to obtain a bit patterned medium (BPM) with high precision, the inventor of the present invention has made an investigation on the reason for the difficulty in uniform plating of alumina nano holes having a diameter not larger than 25 nm. It has been clarified through this investigation that the ANHs can be uniformly plated by drying at a temperature higher than 70° C. in vacuum. Therefore, it has been found that the nano holes are not filled uniformly because the plating liquid hardly enters the ANHs having a small diameter according to the reasoning based on Equation (1).

The inventor further studied the reason for the difficulty in uniform plating on an ANH having a diameter not larger than 25 nm and found that the electrolytic solution for anodization or the aqueous solution of phosphoric acid for expanding the nano hole (described afterwards) is hardly eliminated from an ANH with a small diameter by cleaning treatment.

When an ANH contains residual electrolytic solution for anodization, such as oxalic acid solution or phosphoric acid solution for nano hole expansion, the oxalic acid solution, for example, is forced to be reduced in the very early stage of the electrolytic plating process in the situation without the plating liquid in the bottom of the ANH. Thus, the hydrogen ions, not the metal ions to be plated, are reduced generating hydrogen gas abruptly at the bottom of the ANH. This event damages not only the alumina-containing layer but also the underlying intermediate layer inhibiting electric current conduction and electrolytic plating.

It has been confirmed as mentioned previously that a drying treatment in vacuum enables filling of magnetic substance by plating. This technique, however, eliminates only the moisture component by vacuum drying, leaving the oxalic acid or phosphoric acid. The adhesive force between the electroplated magnetic metal and the intermediate layer in this condition is weak. In addition, corrosion occurred in a high temperature, high humidity test, degrading the magnetic performance.

The technology to anodize aluminum and fill the ANHs produced there with a metal has been used in building materials, such as wall materials and window frame, in mass from long ago, as well as in the BPM. In those application fields, the degradation due to contaminant substance remaining in the bottom of the ANHs is known and some countermeasures have been disclosed as follows.

Satoshi KAWAI, "Functional Anodic Treatment on Aluminum", a Japanese language monograph published by Maki Publishing Co., Ltd. p. 146-150 (2005), discloses that after forming ANHs and before filling the ANHs with a metal, the article to be treated is immersed in pure water for a long time of longer than 10 hr for sufficient substitution, or the article is subjected to an AC electrolytic neutralization treatment while immersed in a neutral electrolytic solution.

However, the cleaning method of immersion substitution using pure water for a long time, e.g., over 10 hr, is not suited for manufacturing a magnetic recording media, which are mass-produced products. The cleaning method of the AC electrolytic neutralization treatment using a neutral electrolytic solution eventually leaves a type of electrolytic solution. Therefore, the method is not suitable for a magnetic recording medium in view of reliability, since the magnetic recording medium is an extremely precise electronic device different from building materials.

Accordingly, the inventor, considering the above mentioned circumstances, has found a method for solving the problem and thoroughly eliminating the electrolytic solution and drying up. In the method, the lamination having ANHs formed in a special configuration is immersed immediately after formation of the ANHs into a super-critical fluid for cleaning and drying.

More in detail, the nano holes are formed simultaneously with the process of anodizing the aluminum-containing layer provided on the intermediate layer to transform into an alumina-containing layer, and then the ANHs are grown until the intermediate layer is exposed. After that, predetermined cleaning and drying processes are carried out. This procedure improves alignment of magnetic substance that is to be embedded afterwards as compared with the case the ANHs are formed solely in the alumina-containing layer. As a consequence, a bit patterned medium (BPM) is obtained with high precision.

Method of Manufacturing a Magnetic Recording Medium

The method of manufacturing a magnetic recording medium according to the invention will be described in detail with reference to the accompanying drawings. The following examples are, however, only illustrative and can be appropriately modified by a person skilled in the art.

Figure 1A:
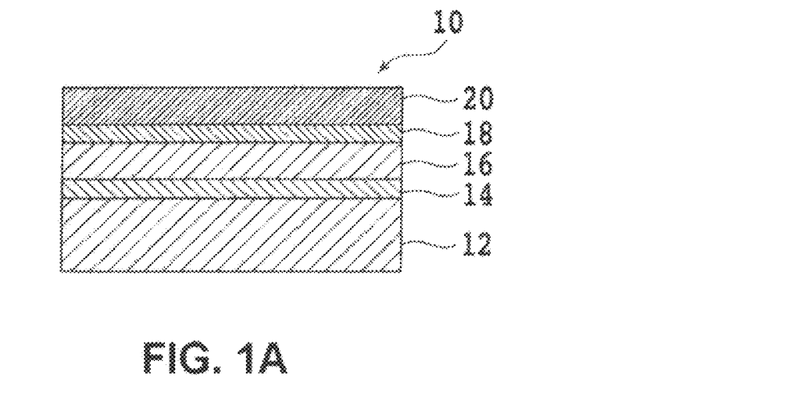
FIG. 1(a) shows a step of forming an electrically conductive intermediate layer 18 over a nonmagnetic substrate 12 and forming an aluminum-containing layer 20 on the intermediate layer 18.
Figure 1B:
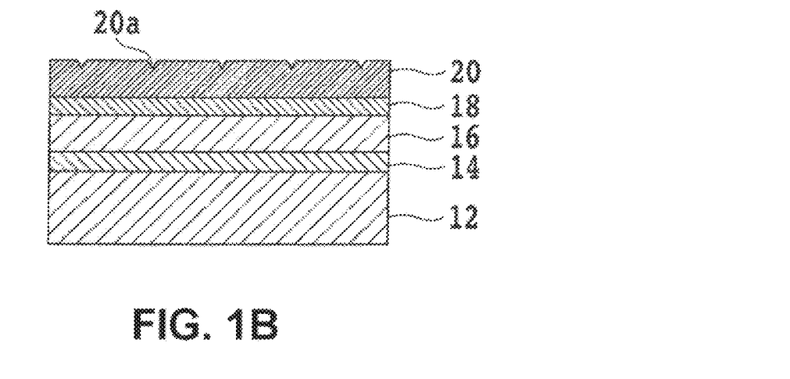
FIG. 1(b) shows a step of forming micro pits 20a on the aluminum-containing layer 20.
Figure 1C:
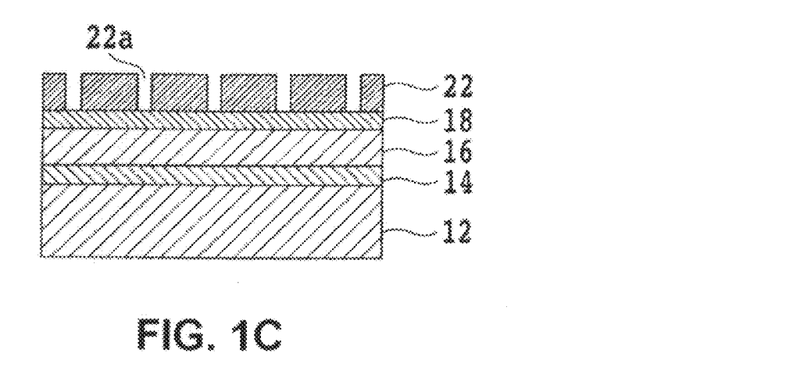
FIG. 1(c) shows a step of generating an alumina-containing layer 22 by oxidizing the aluminum-containing layer 20 and simultaneously forming nano-holes 22a in the alumina-containing layer 22 originating from the micro pits 20a to expose the intermediate layer 18.
Figure 1D:
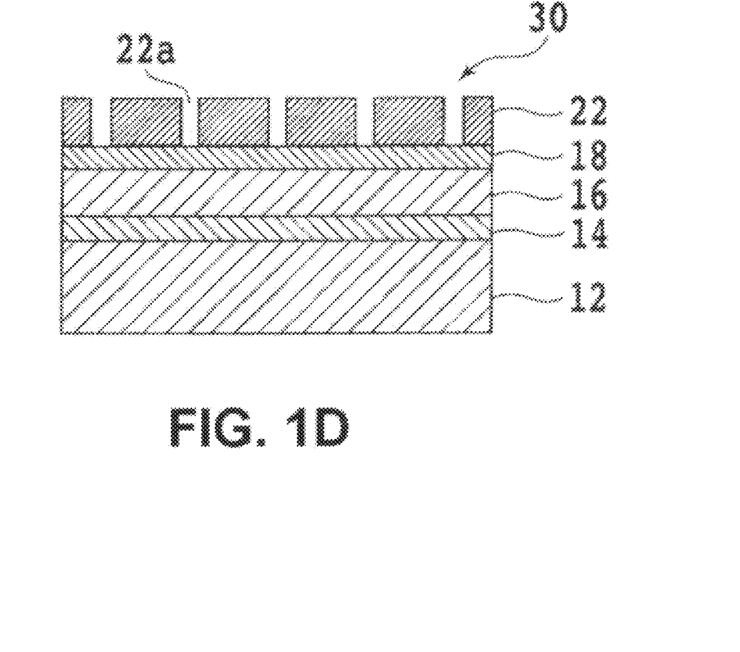
FIG. 1(d) shows a step of cleaning and drying the nano holes 22a using a sub- and super-critical fluid.
Figure 1E:
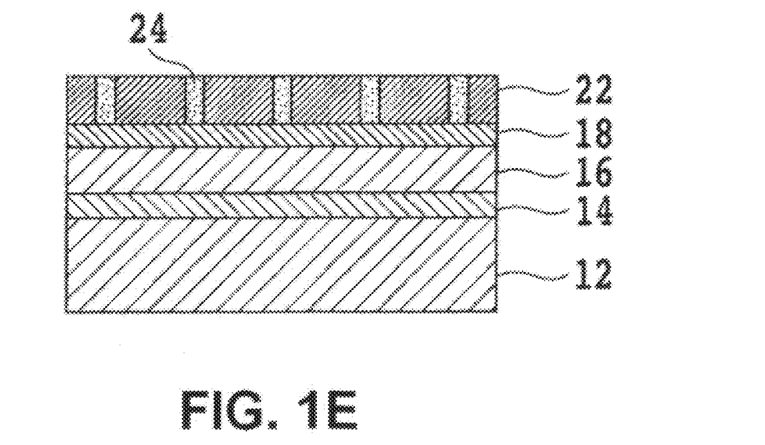
FIG. 1(e) shows a step of depositing a magnetic metal selectively on the intermediate layer 18 to form a magnetic recording layer having a plurality of magnetic recording elements 24.

FIGS. 1(a) through 1(e) are sectional views showing the steps in a method of manufacturing a magnetic recording medium 10 according to the invention, wherein FIG. 1(a) shows a step of forming an electrically conductive intermediate layer 18 over a nonmagnetic substrate 12 and forming an aluminum-containing layer 20 on the intermediate layer 18, FIG. 1(b) shows a step of forming micro pits 20a on the aluminum-containing layer 20, FIG. 1(c) shows a step of generating an alumina-containing layer 22 by oxidizing the aluminum-containing layer 20 and simultaneously forming nano-holes 22a in the alumina-containing layer 22 originating from the micro pits 20a to expose the intermediate layer 18, FIG. 1(d) shows a step of cleaning and drying the nano holes 22a using a sub- and supercritical fluid, and FIG. 1(e) shows a step of depositing a magnetic metal selectively on the intermediate layer 18 to form a magnetic recording layer having a plurality of magnetic recording elements 24.

A Detailed Description of Each Step of the Method Follows.

Step 1, as shown in FIG. 1(a), is a step of forming an electrically conductive intermediate layer 18 over a nonmagnetic substrate 12 and forming an aluminum-containing layer 20 on the intermediate layer 18.

In the example of FIG. 1(a), an underlayer 14, a soft magnetic underlayer (SUL) 16, and an intermediate layer 18 are successively formed on a nonmagnetic substrate 12.

Preparation of Nonmagnetic Substrate 12:

A nonmagnetic substrate 12 is a structural element disposed at the bottom of a magnetic recording medium 10 for supporting the other structural elements 14 to 20 (which will be described afterwards) of the magnetic recording medium 10 successively formed thereon. The nonmagnetic substrate 12 is necessarily resistant to the conditions (solvent, temperature etc.) in the anodization process described afterwards, and preferably exhibits good dimensional stability. The nonmagnetic substrate 12 can be manufactured using materials conventionally used for manufacturing ordinary magnetic recording media, including a Ni—P plated aluminum alloy, strengthened glass, crystallized glass, and in addition, silicon substrate.

The nonmagnetic substrate 12 is preferably cleaned before forming other structural elements 14-20. The cleaning can be conducted by means of scrubbing using a blush, high pressure water jet, or immersion in an alkali detergent. Ultraviolet irradiation may be additionally conducted after one of these cleaning processes.

Formation of Underlayer 14:

The underlayer 14 can be formed using a nonmagnetic material such as a CrTi alloy and employing any methods and conditions known in the art including sputtering methods (DC magnetron sputtering, RF magnetron sputtering and the like) and a vacuum deposition method. A thickness of the underlayer 14 is preferably in the range of 0.1 nm to 20 nm.

Formation of SUL 16:

The SUL 16 is provided for concentrating the perpendicular magnetic field in the magnetic recording layer (described later). The SUL 16 can be formed using a crystalline material such as FeTaC or sendust (FeSiAl) alloy; a micro crystalline material such as FeTaC, CoFeNi, or CoNiP; or an amorphous material selected from cobalt-based alloys such as CoZrNd, CoZrNb, and CoTaZr.

The SUL 16 can be formed using any methods and conditions known in the art including sputtering methods (DC magnetron sputtering, RF magnetron sputtering and the like) and a vacuum deposition method.

A thickness of the SUL varies in its optimum value depending on the structure and characteristics of the magnetic head used for recording, and is preferably in the range of 10 nm to 500 nm in view of productivity.

Intermediate Layer 18:

The intermediate layer 18 is a structural element disposed right beneath the aluminum-containing layer 20 (described later) for constituting a bottom plane of the alumina nano hole. The intermediate layer 18 needs to be formed of an electrically conductive material. The intermediate layer 18 is preferably formed of a noble metal such as Au, Pd, Pt, Rh, Ir, Ru, or Os in order to suppress oxidation of the intermediate layer 18 itself and the SUL 16 in the process of anodization (described later). The intermediate layer 18 formed of a noble metal can adjust crystal orientation of the magnetic recording element 24 (described later) and the SUL 16 disposed under the intermediate layer.

The intermediate layer 18 can be formed using any methods and conditions known in the art including sputtering methods (DC magnetron sputtering, RF magnetron sputtering and the like) and a vacuum deposition method. A thickness of the intermediate layer is preferably in the range of 0.1 nm to 20 nm.

Seed Layer:

In the example shown in FIG. 1(a), a seed layer (not shown in the figure) is optionally provided between the SUL 16 and the intermediate layer 18 in order to control the crystal structure of the magnetic recording layer. The seed layer can be formed using a material selected from: permalloy materials such as NiFeAl, NiFeSi, NiFeNb, NiFeB, NiFeNbB, NiFeMo, and NiFeCr; permalloy materials with an additive of cobalt such as CoNiFe, CoNiFeSi, CoNiFeB, and CoNiFeNb; cobalt; cobalt-based alloys such as CoB, CoSi, CoNi, and CoFe.

The seed layer can be formed using any methods and conditions known in the art including sputtering methods (DC magnetron sputtering, RF magnetron sputtering and the like) and a vacuum deposition method. The seed layer favorably has a thickness sufficient for controlling the crystal structure of the magnetic recording elements 24 and is preferably in the range of 3 nm to 50 nm in the ordinary cases.

Then an aluminum-containing layer 20 is formed on the intermediate layer 18 in the example of FIG. 1(a).

Aluminum-Containing Layer 20:

The aluminum-containing layer 20 is provided for forming an alumina-containing layer 22 including nano holes after anodization by the method described later. The aluminum-containing layer 20 isolates the magnetic recording elements 24 magnetically and thermally in the BPM.

The aluminum-containing layer 20 can be simple aluminum, or aluminum optionally containing Ta, Mo, Ti, or W, for example.

The aluminum-containing layer 20 can be formed using any methods and conditions known in the art including sputtering methods (DC magnetron sputtering, RF magnetron sputtering and the like) and a vacuum deposition method.

A thickness of the aluminum-containing layer 20 is not limited to a special value. However, the thickness is preferably at most 50 nm in view of productivity and enhancement of recording density.

Step 2, as shown in FIG. 1(b), is a step of forming micro pits 20a in the aluminum-containing layer 20.

Formation of the micro pits 20a shown in FIG. 1(b) can be carried out by any method known in the art such as the dry etching method. The micro pits 20a formed in a predetermined pattern produces nano holes 22a in this predetermined pattern after the following step. For forming the micro pits 20a in a predetermined pattern, first, for example, a mask layer (not shown in the figure) is provided on the aluminum-containing layer 20 and the predetermined pattern is transferred on the mask layer by means of a method known in the art such as photo lithography and/or nano imprinting method. Then, certain parts of the aluminum-containing layer 20 are removed by means of a dry etching method. In the example shown in FIG. 1(b), micro pits 20a with a diameter in the range of 1 nm to 50 nm can be formed in the dot pattern with a distance of from 3 nm to 100 nm.

Step 3, as shown in FIG. 1(c), is a step of generating an alumina-containing layer 22 by oxidizing the aluminum-containing layer 20 and simultaneously forming nano holes 22a in the alumina-containing layer 22 originating from the micro pits 20a to expose the intermediate layer 18.

Oxidation of the aluminum-containing layer to generate the alumina-containing layer 22 in FIG. 1(c) can be carried out by means of a so-called anodization process.

Such an oxidation treatment transforms the aluminum-containing layer 20 to an electrically non-conductive alumina-containing layer 22. The treatment is conducted until at least the intermediate layer 18 exposes at the bottom of the nano hole 22a.

Optionally, though not shown in FIG. 1(c), an etching process can be additionally conducted on the nano holes 22a formed by the anodization process using phosphoric acid in order to expand the diameter of the nano holes 22a. In the processes, there is a possibility, when the diameter of the ANH is not larger than 25 nm, that the electrolytic solution for the anodization and/or the phosphoric acid solution for the nano hole expansion treatment do not thoroughly substituted by the pure water used in a water cleaning process and remains in the bottom of the nano holes 22a.

Step 4, as shown in FIG. 1(d), is a step of cleaning and drying the nano holes using a sub- and supercritical fluid.

The medium 30 to be treated shown in FIG. 1(d) is processed in an apparatus for cleaning and drying with supercritical carbon dioxide, for example, in which supercritical carbon dioxide is substituted for the electrolytic solution and/or the phosphoric acid solution remaining at the bottom of the alumina nano holes 22a. After cleaning and elimination, the pressure in the apparatus is reduced to dry the medium at the same time. A supercritical fluid useful in the invention is not limited to special types of fluid but includes any fluid that can substitute for and eliminate the electrolytic solution and the phosphoric acid solution. Useful supercritical fluid includes known supercritical fluid of carbon dioxide, ethane, propane, butane, heptane, dimethylether, and ethanol.

However, supercritical water, having a high critical temperature and being highly active, is not favorable because a medium to be processed 30 immersed in the supercritical water dissolves the alumina nano holes 22a and deforms the nano holes 22a. The carbon dioxide is preferable among the above listed types of supercritical fluid in view of ease of handling, controllability, solvent ability as a supercritical fluid, and economical efficiency. In the cleaning and drying, a fluid in a subcritical state that is near the critical point can be used obtaining the similar effect.

Figure 2:
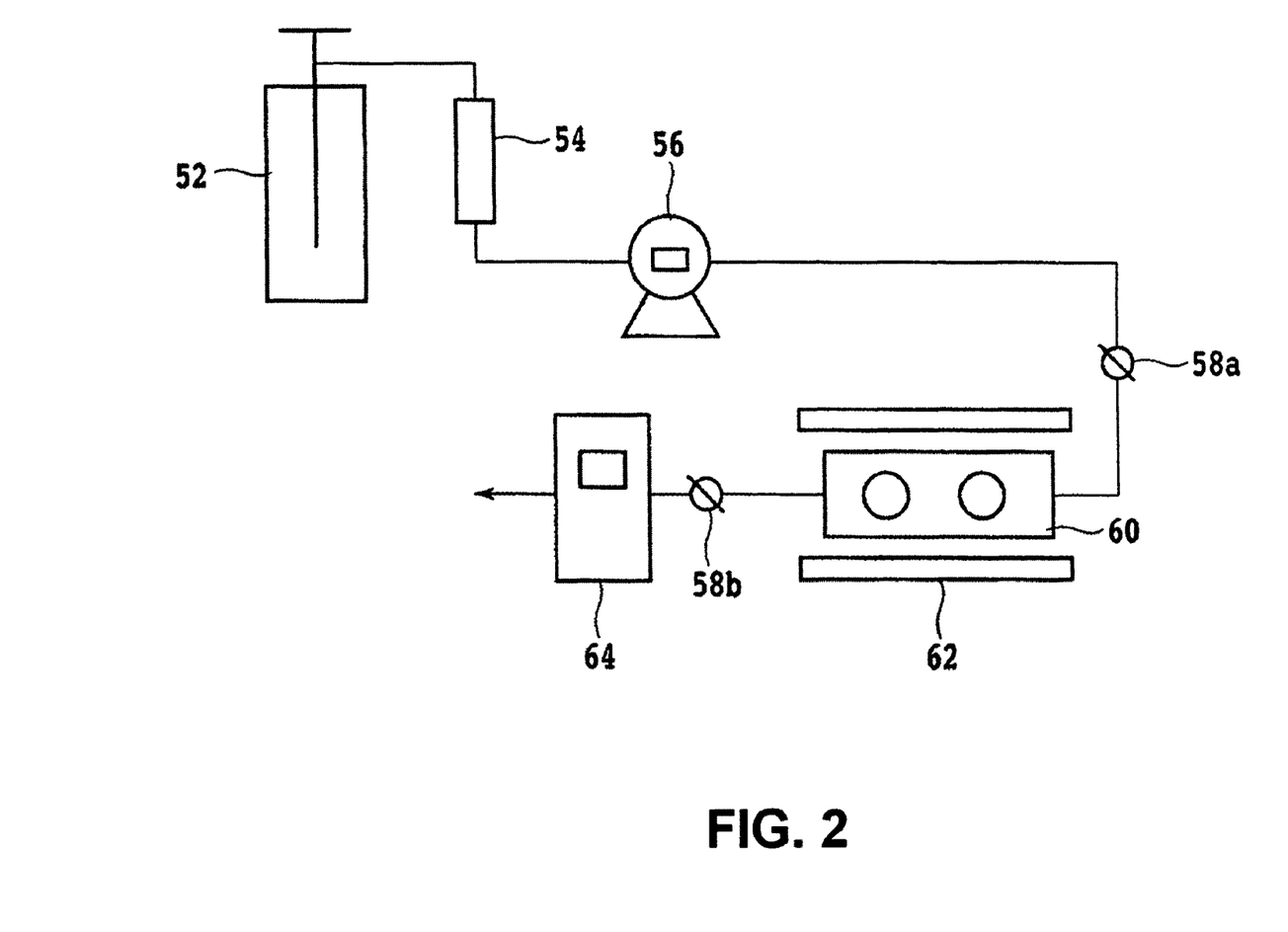
FIG. 2 shows schematically an apparatus for use in the step of cleaning and drying shown in FIG. 1(d).

FIG. 2 is a schematic drawing of an apparatus for use in the cleaning and drying step shown in FIG. 1(d). The apparatus comprises, from the upstream to downstream of the liquid carbon dioxide, a high pressure vessel 52, a cooling unit 54, a high pressure pump 56, a first valve 58a, a reactor chamber 60, a heater 62, second valve 58b, and a pressure regulator 64. Detailed description is made in the following with reference to FIG. 2 on the steps (1) through (4) described below of an example of the process for cleaning and drying the electrolytic solution and/or the phosphoric acid solution using a supercritical fluid. An apparatus for cleaning and drying the nano holes using a supercritical carbon dioxide fluid is not limited to the batch processing construction as shown in FIG. 2, but it is possible to use a processing scheme of flowing supercritical carbon dioxide fluid (not shown in the figure).

(1) Liquidized carbon dioxide supplied in the siphon type high pressure vessel 52 is extracted from the vessel 52 and fed to the reactor chamber 60 through the high pressure pump 56. Here, if a portion of the extracted carbon dioxide is vaporized at a reduced pressure in the extraction process, the extracted carbon dioxide can be completely liquidized in the cooling unit 54.

(2) The medium to be processed 30 is installed in the reactor chamber 60. The medium comprises the alumina-containing layer 22 formed in the previous step including the nano holes 22a formed in the predetermined pattern, and at the bottom of the nano hole 22a, the intermediate layer 18 is exposed.

(3) The reactor chamber 60 is filled with the liquidized carbon dioxide and after closing the valve 58a and the valve 58b, the liquidized carbon dioxide is heated with the heater 62, generating a supercritical carbon dioxide fluid. Preferable conditions in the reactor chamber 60 are a heating temperature in the range of 40° C. to 80° C. and a pressure in the range of 10 to 15 MPa. The pressure can be controlled at a desired pressure value by means of the pressure regulator 64 based on the value indicated by a pressure gauge (not shown in the figure) provided on the reactor chamber 60. When the pressure in the chamber exceeds the target pressure value by heating of the carbon dioxide, the valve 58b is opened and the pressure regulator adjusts the pressure. Although a heating temperature over 80° C. results in the similar effect, it gives no economical effect. Therefore, a heating temperature of in the range of 40° C. to 80° C. is sufficient.

(4) A surface tension of the supercritical fluid is zero (see Eiichi KONDOU, HYOUMEN GIJUTU (Surface Technology), Vol. 57, No. 10, p. 13-18 (2006), a Japanese language article) in the reactor chamber 60. Consequently, the supercritical carbon dioxide fluid uniformly enters into the nano holes 22a that are formed on the surface of the medium to be processed 30 with a fine pattern. Therefore, the supercritical carbon dioxide fluid readily substitutes for the electrolytic solution and/or the phosphoric acid solution, thereby thoroughly cleaning and eliminating those solutions. Since the supercritical carbon dioxide readily evaporates upon decrease of the pressure, the drying process can be performed simply.

Through the steps up to this step, the nano holes 22a are formed in the desired pattern, the bottom of the holes being exposed to the intermediate layer 18 as shown in FIG. 1(d). Thus, a processed medium 30 comprising an alumina-containing layer 22 that rarely contains remainder of the electrolytic solution for the anodization-process and/or the phosphoric acid solution is obtained; the remainder of the solution has been conventionally a problem.

Step 5 is a step of depositing a magnetic metal selectively on the intermediate layer 18 to form a magnetic recording layer having a plurality of magnetic recording elements 24 as shown in FIG. 1(e).

In the step of FIG. 1(e), a magnetic metal is selectively chemically reduced by electrolytic plating on the intermediate layer 18 that is exposed at the bottom of the nano holes 22a formed in the alumina-containing layer 22, thereby forming magnetic recording elements 24.

The plating liquid to become the magnetic recording elements 24 by reduction can be a liquid containing a sulfide or sulfate compound having a central metallic element such as iron or cobalt. For the purpose of plating platinum or palladium that forms an alloy with iron or cobalt and exhibits high magnetic performances, chloroplatinic acid or palladium chloride can be added in this plating liquid. A raw plating liquid containing ion, cobalt, platinum and palladium is not limited to the above mentioned examples, but any raw material known in the art can be used, and as needed, a chelate agent can be added yet.

The surface of the thus obtained magnetic recording medium is optionally polished to amend the surface configuration, though not shown in the figure. Further, a smoothing treatment on the surface can be performed by a dry etching method.

The thus obtained magnetic recording medium is optionally subjected to an annealing treatment in vacuum or in a hydrogen-based reduction gas at a temperature in the range of 200° C. to 600° C., though not shown in the figure. The annealing treatment is more favorable when conducted with application of a magnetic field of 0.5 T or higher.

Finally, a protective layer and a lubricant layer are optionally formed covering the alumina-containing layer 22 and the magnetic recording elements 24, though not shown in the figure. The protective layer is provided for the purpose of protecting the magnetic recording layer (composed of the alumina-containing layer 22 and the magnetic recording elements 24) and the underlying construction layers 12 through 18. The protective layer can be formed using carbon such as amorphous carbon, or a material selected from various thin film materials known as protective films for magnetic recording media. The protective layer can generally be formed by means of sputtering methods (DC magnetron sputtering, RF magnetron sputtering and the like), a vacuum deposition method, and a CVD method.

A liquid lubricant layer is provided for the purpose of giving lubricity when a read/write head comes in contact with the magnetic recording medium. The liquid lubricant layer can be formed using perfluoropolyether liquid lubricant or various types of liquid lubricant known in the art and by means of any application techniques known in the art including a dip coating method and a spin coating method.

As described thus far, by cleaning and drying the nano holes in the alumina-containing layer using a sub- and super-critical fluid, the electrolytic solution or the like remained in the nano holes can be thoroughly eliminated. Consequently, a magnetic metal is selectively reduced on the intermediate layer exposed at the bottom of the nano holes by means of electroplating method, filling the nano holes uniformly with the magnetic metal. Therefore, the magnetic recording medium as shown in FIG. 1(e) can be used as a bit patterned medium (BPM) comprising a plurality of magnetic recording elements that are arranged with high precision and isolated with each other.

EXAMPLES

The effects of the present invention will be demonstrated with reference to specific examples in the following. It should be acknowledged that the examples are only illustrative and not intended to limit the invention.

Formation of a Magnetic Recording Medium:

Example 1

A magnetic recording medium was formed according to the steps shown in FIGS. 1(a) through 1(e). First, a substrate 12 was prepared using a silicon substrate of nominal size of 2.5 inches having the dimensions of a diameter of 65 mm and a thickness of 0.635 mm. The substrate was cleaned and dried, and introduced into a sputtering device, in which an underlayer 14 of a CrTi film 2 nm thick was formed on the principal surface of the substrate by means of a sputtering method. Then, a SUL 16 of CoZrNd film 40 nm thick was formed on the underlayer 14 by means of the sputtering method. Then, a seed layer of CoNiFeSi film 16 nm thick was formed on the SUL 16 by means of the sputtering method. Subsequently, an intermediate layer 18 of a ruthenium film 12 nm thick was formed on the seed layer by means of the sputtering method.

Then, an aluminum-containing layer 20 of an aluminum film 50 nm thick was formed on the intermediate layer 18 by means of the sputtering method. Thus, a starting medium to be processed was obtained.

On the medium for processing, a resist layer having a predetermined pattern was formed by means of a nano imprinting method. First, a resist called spin on glass (SOG) was deposited to a thickness of about 50 nm on the surface of the starting medium for processing by a spin coating method. Then, using a die for nano imprinting provided with a square arrangement having a height of 25 nm and a pitch of 25 nm, a resist layer having a pattern of protrusions and recesses was formed by pushing the die against the obtained coating film with a pressure of 15 kN/cm$^2$ (150 MPa) for 120 seconds. Subsequently, the SOG film remained in the recess of the pattern of the resist layer was removed by $CF_4$ gas etching using a RIE (reactive ion etching) device, to expose the aluminum-containing layer 20. After that, micro pits with a depth of about 30 nm were formed on the surface of the aluminum-containing layer 20 by etching with the $CF_4$ gas using the RIE device. After that, the $CF_4$ gas etching treatment was conducted again to remove the remained SOG resist from the whole surface of the aluminum-containing layer 20.

The thus obtained medium for processing comprising the aluminum-containing layer 20 having the micro pits 20a formed thereon was subjected to an anodizing treatment to transform the aluminum-containing layer 20 into an alumina-containing layer 22 and to form nano holes 22a from the positions of the micro pits 20a vertically to the principal plane of the substrate. The conditions in the anodizing treatment were anodization liquid of aqueous solution of 3.5% oxalic acid cooled at 3° C., an applied voltage of 9.5 volts, and the application duration of the voltage of 300 seconds. The obtained nano holes 22a had a diameter of 6 nm.

The medium for processing including the nano holes 22a formed therein was immersed in a 5% aqueous solution of phosphoric acid for 300 seconds to expand the diameter of the nano holes 22a to a value from 20 to 22 nm.

Then, the obtained substrate for processing 30 was cleaned and dried using the device shown in FIG. 2. In this process, the surface of the medium for processing 30 was cleaned with pure water immediately after the anodizing treatment and quickly installed in the chamber of a cleaning and drying device without intervening drying process and immersed in a supercritical carbon dioxide fluid. This quick operation was conducted for avoiding creation of boehmite, which is a type of crystalline alumina hardly dissolvable in water and the supercritical carbon dioxide. The boehmite may be transformed from aluminum salt solved in these solutions as well as from the oxalic acid remained in the nano holes 22a if the medium is left in a dry environment.

Then, ten sheets of the media for processing 30 were set on a support jig made of Teflon (trademark) in the reactor chamber 60 with a volume of 2.5 liter, and after tightly closing the reactor chamber 60, the valve 58a was opened to fill the reactor chamber 60 with liquid carbon dioxide of 25° C. and 7.4 MPa. After that, the temperature in the chamber 60 was heated up to a temperature in the range from 40° C. to 80° C. with the heater 62 to generate supercritical carbon dioxide fluid. The pressure at this moment was 10 MPa. The temperature and pressure were held for 60 seconds and the foreign substances of oxalic acid, phosphoric acid and the like remained in the nano holes 22a in the medium for processing 30 were washed away and eliminated. Then the pressure was decreased and at the same time, drying treatment was conducted. Although the cleaning was conducted using supercritical carbon dioxide, the same effects are presumed to be achieved using a fluid in a subcritical state near the critical point.

After that, the nano holes 22a were filled with cobalt using an acidic sulfate material of the cobalt plating liquid Co-100ES (a product of Japan Pure Chemical Co., Ltd.) by means of a current pulse plating method under the conditions of a liquid temperature of 35° C. and a current density of 3 mA/cm$^2$ for 300 seconds.

Then, chemico-mechanical polishing (CMP) was conducted to improve flatness of the surface adjusting the arithmetic mean flatness Ra (defined in JIS B0601:2001) at a value at most 0.2 nm.

Subsequently, the taken out medium was subjected to a vacuum annealing treatment at 300° C. for 30 minutes for the purpose of improving magnetic characteristics of the cobalt filled in the processed medium. Then, on the medium, a protective layer of amorphous carbon (a-C) with a film thickness of 3 nm was formed. Finally, a lubricant layer 2 nm thick was formed by means of a dip coating method. Thus, a magnetic recording medium of Example 1 was obtained.

Example 2

A magnetic recording medium of Example 2 was obtained in the same manner as in Example 1 except that the nano holes 22a were filled with iron using an iron plating liquid of sulfate system in place of the cobalt plating liquid of acidic sulfate system.

Example 3

Twelve types of magnetic recording media of Example 3 were obtained in the same manner as in Example 1 except that the intermediate layer 18 was formed of Os, Pt, Pd, Ir, Rh, or Au in place of the Ru, and the nano holes 22a were filled with cobalt or iron using the cobalt plating liquid of Co-100ES (a product of Japan Pure Chemical Co., Ltd.) of an acidic sulfate system or an iron plating liquid of sulfate system.

Example 4

A magnetic recording medium of Example 4 was obtained in the same manner as in Example 1 except that the nano holes 22a were filled with a FePt alloy using a mixture of an iron plating liquid of sulfate system and a plating liquid of chloro-platinum acid system in place of the cobalt plating liquid of acidic sulfate system, and that the vacuum annealing temperature was changed to 500° C.

Example 5

A magnetic recording medium of Example 5 was obtained in the same manner as in Example 1 except that the nano holes 22a were filled with a FePd alloy using a mixture of an iron plating liquid of sulfate system and a plating liquid of palladium chloride system in place of the cobalt plating liquid of acidic sulfate system, and that the vacuum annealing temperature was changed to 500° C.

Example 6

A magnetic recording medium of Example 6 was obtained in the same manner as in Example 1 except that the nano holes 22a were filled with a CoPt alloy using a mixture of a cobalt plating liquid of acidic sulfate system and a plating liquid of chloro-platinum acid system in place of the cobalt plating liquid of acidic sulfate system, and that the vacuum annealing temperature was changed to 500° C.

Example 7

A magnetic recording medium of Example 7 were obtained in the same manner as in Example 1 except that the nano holes 22a was filled with a CoPd alloy using a mixture of a cobalt plating liquid of acidic sulfate system and a plating liquid of palladium chloride system in place of the cobalt plating liquid of acidic sulfate system, and that the vacuum annealing temperature was changed to 500° C.

Evaluation Items:

In the technologies to date, no magnetic head exists capable of read/write of single bit size of 25 nm diameter. Accordingly, studies were conducted on the magnetic recording elements having a diameter of not larger than 25 nm formed in the magnetic recording media of Examples 1 through 7 for uniformity and magnetic isolation characteristic of the magnetic recording elements.

Uniformity of Magnetic Recording Elements:

The magnetic recording media of Examples 1 through 7 were studied for uniformity of the magnetic recording elements using a magnetic force microscope (MFM) capable of operation in vacuum. Every magnetic recording medium of Examples 1 through 7 exhibited uniform magnetic characteristics of the magnetic recording elements.

Magnetic Isolation Characteristic of Magnetic Recording Elements:

The magnetic recording media of Examples 1 through 7 were studied for isolation characteristic of the magnetic recording elements using a magnetic force microscope (CFM) capable of operation in vacuum. Every magnetic recording medium of Examples 1 through 7 exhibited satisfactory magnetic isolation characteristics of the magnetic recording elements, and it has been demonstrated that a high precision BPM structure has been obtained as expected.

Although the specified types of plating liquid were used in the Examples 1 through 7, useful plating liquid is not limited to those plating liquid, but it will be understood by those skilled in the art that a plating liquid with a different composition widely known in the art achieves the effects of the present invention.

According to the method of manufacturing a magnetic recording medium of the invention, the nano holes are formed in the alumina-containing layer and the intermediate layer, and the cleaning process is conducted using a sub- and super-critical fluid. Consequently, a bit patterned medium (BPM) is obtained having a plurality of magnetic recording elements in isolated arrangement and with high precision. Therefore, the method of the invention is promising because it provides a bit patterned media (BPM) with high precision in the field of recording media where ever continuing enhancement of recording density is demanded.

While the present invention has been described in conjunction with embodiments and variations thereof, one of ordinary skill, after reviewing the foregoing specification, will be able to effect various changes, substitutions of equivalents and other alterations without departing from the broad concepts disclosed herein. It is therefore intended that Letters Patent granted hereon be limited only by the definition contained in the appended claims and equivalents thereof.

What is claimed is:

1. A method of manufacturing a magnetic recording medium, comprising the steps of:
    (a) forming an intermediate layer that is electrically conductive over a non-magnetic substrate;
    (b) forming an aluminum-containing layer on the intermediate layer;
    (c) forming a plurality of micro pits in the aluminum-containing layer;
    (d) generating an alumina-containing layer by anode oxidation of the aluminum-containing layer in an electrolytic solution for anodization and simultaneously forming a plurality of nano holes in the alumina-containing layer originating from the plurality of micro pits respectively to expose the intermediate layer;
    (e) cleaning with pure water immediately after anode oxidation in step (d) and without intervening drying to avoid forming boehmite;
    (f) cleaning and drying the plurality of nano holes immediately after step (e) using a fluid selected from the group consisting of a sub- and super-critical carbon dioxide fluid to remove foreign substances and dry the plurality of nano holes, and provide a plurality of cleaned and dried nano holes; and
    (g) depositing a magnetic metal, after cleaning and drying, selectively through the plurality of cleaned and dried nano holes in the alumina-containing layer on the intermediate layer to form a plurality of magnetic recording elements that collectively comprise a magnetic recording layer,
    wherein cleaning and drying prior to depositing removes substantially all of the foreign substances including residual electrolytic solution for anodization so that gas formation by residual electrolytic solution within the plurality of nano holes is eliminated during depositing of the magnetic material.

2. The method of manufacturing a magnetic recording medium according to claim 1, wherein the intermediate layer is composed of a material selected from the group consisting of metallic elements of Ru, Os, Pt, Pd, Ir, Rh, and Au, and alloys mainly composed of these metallic elements.

3. The method of manufacturing a magnetic recording medium according to claim 1, wherein the magnetic metal is selected from the group consisting of cobalt, iron, and alloys of Fe—Pt, Co—Pt, Fe—Pd, and Co—Pd.

4. The method of manufacturing a magnetic recording medium according to claim 3, wherein each of the plurality of nano holes has a diameter that does not exceed 25 nm.

5. The method of manufacturing a magnetic recording medium according to claim 3, wherein the intermediate layer is composed of a material selected from the group consisting of metallic elements of Ru, Os, Pt, Pd, Ir, Rh, and Au, and alloys mainly composed of these metallic elements.

6. The method of manufacturing a magnetic recording medium according to claim 1, wherein each of the plurality of nano holes has a diameter that does not exceed 25 nm.

7. The method of manufacturing a magnetic recording medium according to claim 6, wherein the intermediate layer is composed of a material selected from the group consisting of metallic elements of Ru, Os, Pt, Pd, Ir, Rh, and Au, and alloys mainly composed of these metallic elements.

8. The method of manufacturing a magnetic recording medium according to claim 4, wherein the intermediate layer is composed of a material selected from the group consisting of metallic elements of Ru, Os, Pt, Pd, Ir, Rh, and Au, and alloys mainly composed of these metallic elements.

9. The method of manufacturing a magnetic recording medium according to claim 1, wherein the step of depositing the magnetic metal selectively through the plurality of nano holes on the intermediate layer is accomplished by electrochemically depositing the magnetic metal.

10. The method of manufacturing a magnetic recording medium according to claim 9, wherein electrochemically depositing the magnetic metal takes place uniformly and selectively through the plurality of nano holes directly onto and in contact with the intermediate layer.

11. The method according to claim 1, wherein depositing a magnetic metal is accomplished by electrochemically depositing the magnetic metal uniformly and selectively through the plurality of clean and dried nano holes directly onto and in contact with the intermediate layer to form a plurality of magnetic recording elements that collectively comprise a magnetic recording layer.

12. A method of manufacturing a magnetic recording medium, comprising the steps of, in the order recited:
    (a) forming an intermediate layer that is electrically conductive over a non-magnetic substrate;
    (b) forming an aluminum-containing layer on the intermediate layer;
    (c) forming a plurality of micro pits in the aluminum-containing layer by dry etching in a pattern using photolithography;
    (d) generating an alumina-containing layer by anode oxidation of the aluminum-containing layer in an electrolytic solution for anodization and simultaneously forming a plurality of nano holes in the alumina-containing layer originating from the plurality of micro pits respectively to expose the intermediate layer, each of the plurality of nano holes having said pattern and having a diameter that does not exceed 25 nm;
    (e) cleaning the with pure water immediately after anode oxidation in step (d) and without intervening drying to avoid forming boehmite;
    (f) cleaning and drying the plurality of nano holes immediately after step (e) using a sub- and super-critical fluid to remove foreign substances and dry the plurality of nano holes, and provide a plurality of cleaned and dried nano holes; and
    (g) electrochemically depositing a magnetic metal, after cleaning and drying, uniformly and selectively through the plurality of clean and dried nano holes in the alumina-containing layer directly onto and in contact with the intermediate layer to form a plurality of magnetic recording elements that have said pattern and that collectively comprise a magnetic recording layer, wherein cleaning and drying prior to depositing removes substantially all of the foreign substances including residual electrolytic solution for anodization so that gas formation by residual electrolytic solution within the plurality of nano holes is eliminated during depositing of the magnetic material.

13. The method according to claim 12, wherein the sub- and super-critical fluid is a fluid selected from the group consisting of a sub- and super-critical carbon dioxide fluid.

* * * * *